(12) United States Patent
Gorenflo et al.

(10) Patent No.: US 10,215,609 B2
(45) Date of Patent: Feb. 26, 2019

(54) METHOD FOR FILL LEVEL MEASUREMENT USING THE TRAVEL TIME PRINCIPLE

(71) Applicant: Endress + Hauser GmbH + Co. KG, Maulburg (DE)

(72) Inventors: Stefan Gorenflo, Hausen (DE); Alexey Malinovskiy, Maulburg (DE); Klaus Pankratz, Kandern (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 274 days.

(21) Appl. No.: 14/404,091

(22) PCT Filed: May 21, 2013

(86) PCT No.: PCT/EP2013/060417
§ 371 (c)(1),
(2) Date: Nov. 26, 2014

(87) PCT Pub. No.: WO2013/182418
PCT Pub. Date: Dec. 12, 2013

(65) Prior Publication Data
US 2015/0101405 A1    Apr. 16, 2015

(30) Foreign Application Priority Data
Jun. 5, 2012 (DE) .......... 10 2012 104 858

(51) Int. Cl.
  *G01F 23/00* (2006.01)
  *G01F 23/28* (2006.01)
  (Continued)

(52) U.S. Cl.
  CPC ........ *G01F 23/284* (2013.01); *G01F 23/0061* (2013.01); *G01F 23/0069* (2013.01); *G01F 23/2962* (2013.01)

(58) Field of Classification Search
  CPC ............ G01F 23/0061; G01F 23/0069; G01F 23/284; G01F 23/2962
  See application file for complete search history.

(56) References Cited

U.S. PATENT DOCUMENTS

| 5,587,969 A | 12/1996 | Kroemer |
| 6,169,706 B1 | 1/2001 | Woodward |

(Continued)

FOREIGN PATENT DOCUMENTS

| DE | 4308373 C2 | 9/1994 |
| DE | 10105652 A1 | 8/2002 |

(Continued)

OTHER PUBLICATIONS

German Search Report, German PTO, Munich, dated Feb. 26, 2013.
(Continued)

*Primary Examiner* — Harshad R Patel
(74) *Attorney, Agent, or Firm* — Bacon & Thomas, PLLC

(57) ABSTRACT

A method for measuring fill level of a fill substance. Transmission signals are sent and their fractions reflected on reflectors in the container and received as received signals. Based on the received, echo functions are derived and wanted echos of predetermined wanted echo types respectively contained in the echo functions and identifiable based on predetermined echo recognition methods are ascertained. Each wanted echo is a local maximum and is attributable to a reflection on a reflector associated with its wanted echo type. Echo quality of each wanted echo is determined. The echo quality is higher, the more peak shaped the echo function is in the region of the respective wanted echo, and the fill level is determined taking into consideration echo qualities of the wanted echos.

9 Claims, 3 Drawing Sheets

(51) Int. Cl.
  *G01F 23/284* (2006.01)
  *G01F 23/296* (2006.01)

(56) References Cited

U.S. PATENT DOCUMENTS

| | | | |
|---|---|---|---|
| 6,345,683 | B1 | 2/2002 | Gordon |
| 7,420,877 | B2 | 9/2008 | Hosseini |
| 2009/0158839 | A1* | 6/2009 | Spanke ................ G01F 23/284 |
| | | | 73/290 V |
| 2010/0162811 | A1 | 7/2010 | Malinovskiy |
| 2012/0174664 | A1* | 7/2012 | Welle ................... G01F 23/284 |
| | | | 73/290 V |

FOREIGN PATENT DOCUMENTS

| | | | | |
|---|---|---|---|---|
| EP | 1918735 | A1 | 5/2008 | |
| EP | 1936403 | A1 | 6/2008 | |
| GB | 2338132 | A | 12/1999 | |
| WO | 02063247 | A2 | 8/2002 | |
| WO | WO 2009037000 | A2 * | 3/2009 | ........... G01S 7/2922 |

OTHER PUBLICATIONS

International Search Report, EPO, The Netherlands, dated Oct. 18, 2013.
English Translation of the International Preliminary Report on Patentability, WIPO, Geneva, dated Dec. 18, 2014.

* cited by examiner

METHOD FOR FILL LEVEL MEASUREMENT USING THE TRAVEL TIME PRINCIPLE

TECHNICAL FIELD

The invention relates to a method for measuring fill level of a fill substance located in a container with a fill-level measuring device working according to the travel time principle, wherein by means of a transmitting and receiving unit transmission signals are sent into the container and their fractions reflected on reflectors in the container back to the transmitting and receiving system, and are received as received signals according to a travel time dependent on their traveled paths. Based on the received signals, echo functions are derived, which give the amplitudes of the received signals as a function of a position corresponding to the associated travel time, and wanted echos respectively contained in the echo functions, which have ascertained predetermined wanted echo types identifiable based on predetermined echo recognition methods. Each wanted echo is a local maximum of the echo function attributable to a reflection on a reflector associated with its wanted echo type, especially a reflector such as a surface of the fill substance, a container floor or a disturbance located in the container.

BACKGROUND DISCUSSION

Fill level measuring devices working according to the travel time principle are applied in a large number of branches of industry, e.g. in various types of processing, in the chemicals industry or in the foods industry.

Typically, the fill-level measuring device is mounted above the container. In measurement operation, in each measuring cycle, a transmission signal, e.g. a microwave signal, is sent by the fill-level measuring device toward the fill substance in the container and its fractions reflected back in the container to the fill-level measuring device received as a received signal according to a travel time dependent on its path traveled in the container. Based on the received signals, echo functions are derived, which give the amplitudes of the received signals as a function of a position corresponding to their travel time or their path traveled in the container. In such case, travel time and path length are convertible into one another based on the propagation velocities of the transmitted and received signals along the traveled paths.

Reflections from reflectors located in the container, such as e.g. the surface of the fill substance, a disturbance located in the container and the container floor, bring about in the echo functions local maxima, referred to herein as echos, at echo positions in the echo function corresponding to distances of the reflectors from the fill-level measuring device.

Applied for determining the travel times can be all known methods, which enable measurement of relatively short distances by means of reflected signals. For microwave signals, these are usually the pulse radar and the frequency modulation continuous wave radar (FMCW radar) methods.

In the case of pulse radar, in each measuring cycle, short microwave transmission pulses are periodically emitted, which are reflected in the container and received back according to the travel time dependent on the path length traveled.

In the case of the FMCW method, in each measuring cycle, a microwave signal is sent continuously, which is periodically linearly frequency modulated, for example, according to a sawtooth function. The frequency of the received signal has, consequently, compared with the instantaneous frequency of the transmission signal at the point in time of receipt of the reflected signal, a frequency difference, which depends on the travel time of the associated microwave signal. The frequency difference between transmission signal and received signal, which can be won by mixing the two signals and evaluating the Fourier spectrum of the mixed signal, corresponds, thus, to the travel time and therewith to the separation of the reflecting surface from the fill-level measuring device. Furthermore, the amplitudes of the spectral lines of the frequency spectrum won from the Fourier transformation correspond to the echo amplitudes. This Fourier spectrum thus represents, in this case, the echo function.

Then, based on predetermined echo recognition methods, wanted echos of predetermined wanted echo types are ascertained in the echo functions. Each wanted echo is a local maximum of the echo function occurring at an associated echo position and is attributable to a reflection on a certain predetermined reflector in the container, especially on the surface of the fill substance, on the container floor or on a disturbance located in the container. Wanted echos are distinguished according to wanted echo type based on the associated, determined reflectors. The most important wanted echo for fill level measurement is the fill-level echo of the reflection on the surface of the fill substance. Other wanted echo types relevant for fill level measurement are the container floor echo attributable to reflections on the container floor, and disturbance echoes attributable to reflections on previously known disturbances.

Echo recognition methods for identification of wanted echos contained in an echo function and methods for checking the plausibility of the associating of an echo to a certain wanted echo type are described, for example, in now published, German patent application DE 10 2004 052 110 A1.

Known from fill level measuring technology are a number of different methods, with which the fill level can be determined based on information, especially echo position information, derived from at least one wanted echo.

To the extent that a fill-level echo can be determined in the echo function, fill level is always determined based on the echo position of this fill-level echo. The echo position corresponds to the travel time, which the transmission signal requires for traveling the path from the transmitting and receiving system to the surface of the fill substance and back. From this travel time, there results in the case of the known propagation velocity of the transmission signals, directly the separation between the surface of the fill substance and the transmitting and receiving system, which can then, based on an installed height of the transmitting and receiving system, be directly converted into the associated fill level.

In cases in which no fill-level echo can be determined, or the classification of an echo candidate for fill-level echo appears questionable, frequently alternative methods are applied for fill level determination, in the case of which supplemental information derived from wanted echos of other wanted echo types is considered.

Thus, for example, fill level can be determined based on the propagation velocity of the signals in the fill substance and the echo position of the container floor echo. If the fill level lies above the installed height of a disturbance, then it can be determined based on the propagation velocity of the signals in the fill substance and the echo position of the associated disturbance echo.

Likewise, a fill-level echo contained in the echo function but not directly identifiable as such can be ascertained based on supplemental information derived from the wanted echos of other wanted echo types. Thus, for example, the echo position of the fill-level echo can be calculated based on the echo position of a container floor echo identified in the echo function, and that local maximum of the echo function subsequently identified as fill-level echo, whose echo position lies nearest the fill level-echo position calculated from the echo position of the container floor echo.

Moreover, methods are known, in the case of which, based on earlier recorded echo functions, a time development of the echo position of the wanted echo of the respective wanted echo type is determined, and therefrom the current echo position of the respective wanted echo is extrapolated.

In the case of all of these methods, there is the problem that information derived from the wanted echos is not always equally reliable.

A frequently occurring cause for this involves, as a rule, not calculable, or not predictable, signal interferences occurring in the container, in the case of which the reflected signal components superimpose in the container with one another or with the transmission signal constructively or destructively. This can lead to a splintering of the echo function in the region of the wanted echo, in the case of which in the immediate vicinity of the local maximum identified as wanted echo other local maxima of comparable amplitude occur. In the case of destructive interferences, it can even happen that the echo function has at the desired position, where the wanted echo would actually occur due to the distance of the associated reflector from the transmitting and receiving system, a local minimum. This can lead to the fact that a local maximum of the echo function directly neighboring this desired position is determined to be the wanted echo. Such an incorrect determination remains frequently unnoticed, and can, as a rule, also not be discovered based on plausibility checks, even with the aid of information derived from additional wanted echos.

Accordingly, the application of these wanted echos, respectively information derived therefrom, such as e.g. their echo positions, can lead to a worsening of the accuracy of measurement of the fill level measurement.

SUMMARY OF THE INVENTION

It is an object of the invention to provide a method for measuring fill level of a fill substance in a container using a fill-level measuring device working according to the travel time principle, with which method a reliably exact fill level determination is achievable.

To this end, the invention provides a method for measuring fill level of a fill substance located in a container with a fill-level measuring device working according to the travel time principle, in the case of which
  transmission signals are sent by means of a transmitting and receiving unit into the container and their fractions reflected from reflectors in the container back to the transmitting and receiving unit according to a travel time dependent on the path length traveled in this way are received as received signals,
  based on the received signals, echo functions are derived, which give amplitudes of the received signals as a function of position corresponding to associated travel time,
  wanted echos of predetermined wanted echo types respectively contained in the echo functions and identifiable based on predetermined echo recognition methods are ascertained, wherein each wanted echo is a local maximum of the echo function and is attributable to a reflection on a reflector associated with its wanted echo type, especially a surface on the fill substance, a container floor or a disturbance located in the container,
  echo quality of each wanted echo is determined, wherein the echo quality is higher, the more peak shaped the echo function is in the region of the respective wanted echo and the more isolated from other local maxima the respective wanted echo is in the echo function, and
  fill level is determined taking into consideration echo qualities of the wanted echos.

In a preferred embodiment of the invention, fill level is determined exclusively based on wanted echos, whose echo quality exceeds a predetermined minimum measure.

In a preferred embodiment of the invention,
  based on the echo qualities of the wanted echos, those wanted echos are determined, from which due to their echo quality reliable information can be derived, and
  only reliable information is taken into consideration for determining fill level.

In a further development, when, based on the wanted echos identified in one of the echo functions, different methods for fill level determination are performable, the echo qualities of these wanted echos are taken into consideration to select and apply that method, in the case of which the therefor required wanted echos have the highest qualities.

In an additional further development, the echo qualities of the wanted echos are determined based on
  an area enclosed under the echo function in a window of predetermined position breadth and amplitude height surrounding the maximum of the respective wanted echo,
  a breadth of the wanted echo, especially a breadth, which equals a difference between those two positions, in the case of which the amplitude of the echo function, based on the echo position of the maximum, has fallen on both sides to a predetermined value, especially a value predetermined as a function of the maximum amplitude of the wanted echo,
  distances of the echo position of the respective wanted echo to positions of directly neighboring local maxima of the echo function,
  an amplitude of the maximum of the respective wanted echo relative to its breadth,
  ratios of the amplitude of the maximum of the respective wanted echo to amplitudes of directly neighboring local maxima of the echo function, and/or
  ratios of the amplitude of the maximum of the respective wanted echo to amplitudes of directly neighboring local minima of the echo function.

In an embodiment of the latter further development, for wanted echos of different wanted echo type different quality criteria are applied for determining their echo quality.

Another further development resides in a method, in the case of which
  a time development of the echo position of wanted echos of at least one wanted echo type is recorded, in that
    in sequentially recorded echo functions, the echo positions of those wanted echos of such wanted echo type are determined, which meet a minimum measure of echo quality, and
    the echo positions of these wanted echos are recorded together with the point in time of the recording of the associated echo function,
  an expected current echo function echo position of the wanted echo of this wanted echo type is extrapolated based on the time development of the echo position of the wanted echos of this wanted echo type, and this extrapolated echo position is provided, especially
as a replacement for the echo position of the respective
wanted echo in the current echo function,
for identification of the wanted echo of the respective
wanted echo type in the current echo function, and/or
for fill level determination.

A further development of the latter method includes a method, in the case of which
an accuracy of the respective echo position extrapolated by means of echo tracking is estimated based on the echo qualities of the wanted echos used for echo tracking of a certain wanted echo type, the time intervals between their registering and a maximum fill level change rate occurring in the container, and
the echo positions extrapolated by means of echo tracking are used taking into consideration their accuracy.

In a preferred embodiment of the invention, a method is applied, in the case of which
used for fill level determination is an, as regards therewith achievable accuracy of the fill level determination, higher ranking basic method, especially a basic method, in the case of which the fill level is determined based on the echo position of the fill-level echo, and
the basic method is supplemented as needed with a supplemental method, with which information required in the basic method is determined, especially information, which due to wanted echos not identifiable in the echo function is not directly available or due to the poor echo quality of the wanted echo, from which it would be derivable, should not be used.

A further development of the latter method includes a method, in the case of which
the basic method is a method, in the case of which fill level is determined based on the echo position of the fill-level echo,
at least one supplemental method is provided for ascertaining the echo position of the fill-level echo, and
one of the provided supplemental methods is executed, only when the wanted echos required for such can be identified in the echo function and have a minimum quality.

A preferred embodiment of the latter method includes a method, in the case of which a provided supplemental method
includes a first method step, in which an echo position range is determined, in which the fill-level echo is to be expected in the current echo function, and
includes a second method step, in which an echo recognition method is executed for identifying the fill-level echo in this echo position range of the current echo function.

In such case, the echo position range in the first method step is preferably derived
based on the echo positions of disturbance echoes,
based on the echo position of the container floor echo, or
based on a time development of the echo position of the fill-level echo derived from the echo positions of the fill-level echos of earlier recorded echo functions.

In an additional further development of the invention, the echo qualities of the wanted echos are taken into consideration in a review and/or a plausibility check of an end or intermediate result of the fill level determination:

BRIEF DESCRIPTION OF THE DRAWINGS

The invention and other advantages will now be explained in greater detail based on the figures of the drawing, in which examples of embodiments are presented; equal elements are provided in the figures with equal reference characters. The figures of the drawing show as follows.

DETAILED DISCUSSION IN CONJUNCTION WITH THE DRAWINGS

Figure 1:
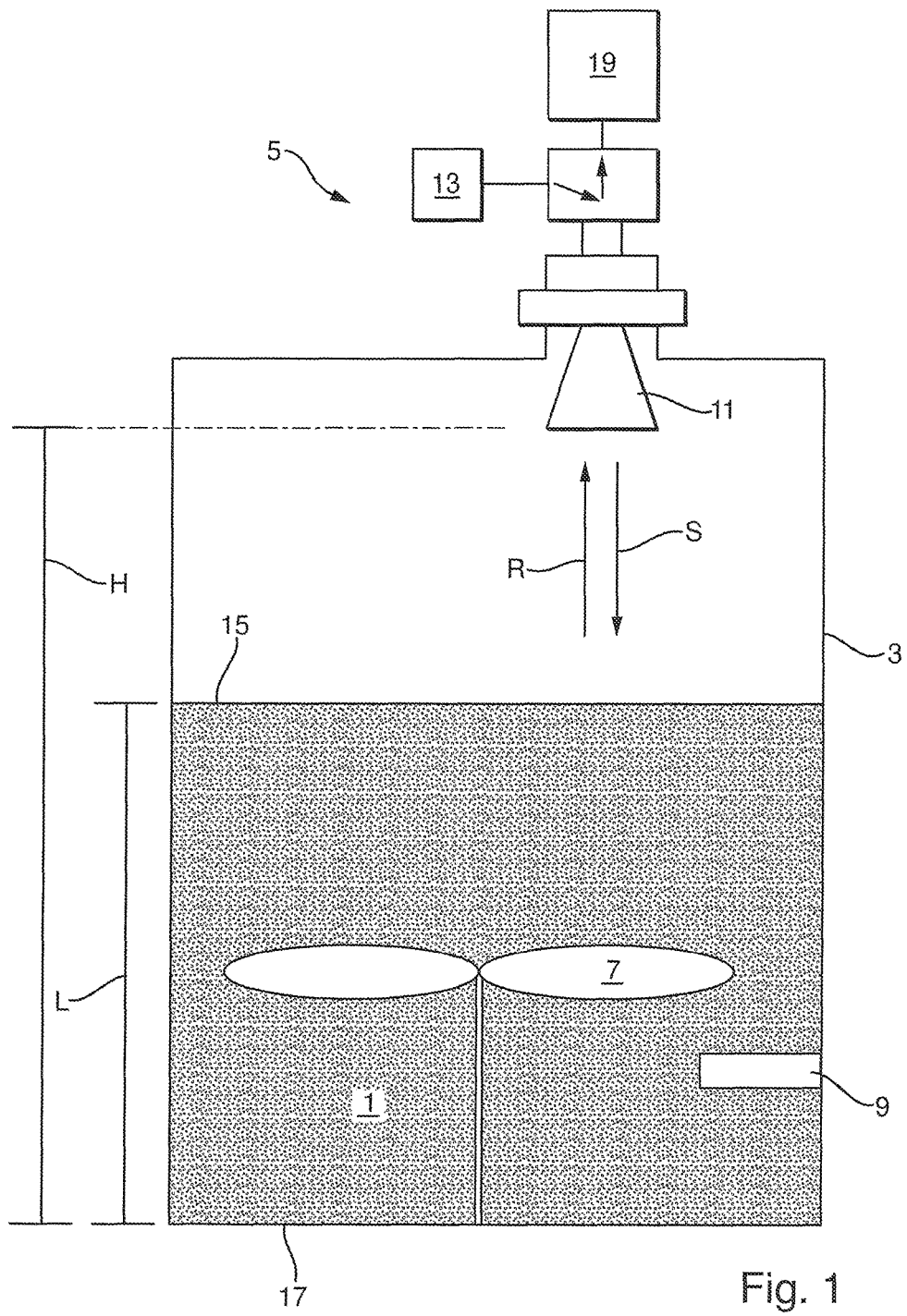
FIG. 1 is an arrangement for fill level measurement with a fill-level measuring device working according to the travel time principle.

FIG. 1 shows an arrangement for fill level measurement. It includes, containing a fill substance 1, a container 3, on which a fill-level measuring device 5 working according to the travel time principle is arranged. Fill-level measuring device 5 serves to measure a fill level L of the fill substance 1 in the container 3. Suited as fill-level measuring device 5 are e.g. the initially described pulse radar and FMCW fill level measuring devices. Drawn in the container 3, by way of example, are a stirrer 7 and a disturbance 9. Disturbances 9 are e.g. objects fixedly installed in the container 3. Reflections can occur on disturbances 9. Here, only a single disturbance 9 is shown, for reasons of easier understanding and perspicuity. Of course, in real measuring situations, many more disturbances can be present.

Fill-level measuring device 5 includes a transmitting and receiving unit 11, which in each measuring cycle sends a transmission signal S produced by means of a transmission signal generator 13 into the container 3, and receives as received signal R its fractions reflected on reflectors in the container 3 back to the transmitting and receiving unit 11 according to a travel time dependent on its path traveled in the container 3.

In the illustrated example of an embodiment, the transmitting and receiving unit 11 is an antenna, which both sends as well as also receives. Alternatively, a transmitting antenna and a receiving antenna separated from the transmitting antenna could be applied.

Among the reflectors located in the container 3 is a surface 15 of the fill substance 1. Additionally, as a function of the fill level L and a dielectric constant of the fill substance 1, reflections can occur on additional reflectors, especially on the disturbance 9 and on the floor 17 of the container 3. The superpositioning of all signal components reflected back to the transmitting and receiving unit 11 forms the received signal R.

The received signal R received during a measuring cycle is fed to a signal processing means 19, which, based on the received signal R, derives an echo function A(t), which gives the amplitudes A of the received signal R as a function of a position t in the echo function A(t) corresponding to the associated travel time. Such procedures are sufficiently known, and are, consequently, not described here in detail.

Figure 2A:
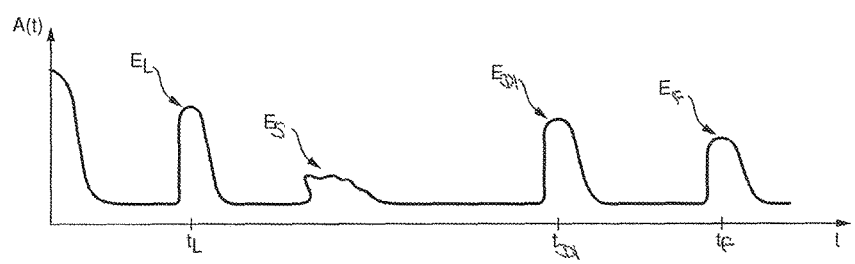
FIG. 2a is an echo function recorded with the arrangement illustrated in FIG. 1 in the case of a fill level lying clearly above the stirrer.
Figure 2B:
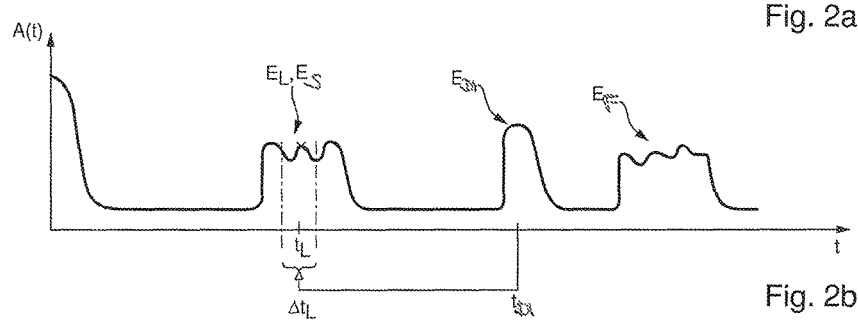
FIG. 2b is an echo function recorded with the arrangement illustrated in FIG. 1 in the case of a fill level lying in the region of the stirrer.

FIG. 2a shows an echo function A(t) obtained with the arrangement illustrated in FIG. 1 in the case of a fill level L located clearly above the stirrer 7. FIG. 2b shows an echo function A(t) obtained with the arrangement illustrated in FIG. 1 in the case of a fill level L located in the region of the stirrer 7.

After deriving the echo function A(t), based on predetermined echo recognition methods, respectively therein contained, identifiable, wanted echos E of predetermined wanted echo types are ascertained by means of the methods. Each wanted echo is a local maximum, which occurs at an associated echo position t and which is attributable to a reflection on a certain reflector associated with its wanted echo type. The wanted echo types comprise fill-level echo $E_L$, container floor echo $E_F$ and disturbance echoes $E_{DI}$.

Multi-echos (not shown) form an additional wanted echo type associated with a particular reflector. They arise from multiple reflections on the particular reflector. A multi-echo corresponds, thus, to a signal fraction of the transmission signal S, which is reflected back and forth two or more times between the transmitting and receiving unit 11 or a container lid and the associated reflector, before it is received by the transmitting and receiving unit 11. The most relevant group is formed, in such case, by multi-echos attributable to two or more reflections on the surface of the fill substance 1.

It depends on the respective measuring situation present during the measuring cycle, whether the wanted echos E of the individual wanted echo types are present in the echo function A(t), and whether the wanted echos E that are present can be identified by means of the installed echo recognition methods as wanted echos E of one of the predetermined wanted echo types. Determinative for this are especially the fill level L actually present in the container 3 and the transmission and reflection characteristics of the fill substance 1.

Echo recognition methods for determining wanted echos of predetermined wanted echo types are known from the state of the art and described e.g. in the initially mentioned DE 10 2004 052 110 A1. In such case, for each wanted echo type, echo recognition criteria are predetermined, based on which wanted echos of the individual wanted echo types are identified as contained in the respective echo function A(t).

Thus, for example, the echo having the greatest amplitude or the first occurring echo can be identified as fill-level echo $E_L$. It is possible to combine these two criteria with one another e.g. by defining a so-called first echo factor. The first echo factor is a predetermined factor, by which an echo must exceed a certain amplitude, in order to be recognized as the fill-level echo.

A further method is described in German patent application DE-A 10260962, filed 20 Dec. 2002. There, the individual wanted echo types are ascertained based on earlier stored data. The data are contained in a table, in which echo functions A(t) derived from received signals R of preceding measuring cycles are stored. The echo functions A(t) are stored in such a manner in the table that each column serves for accommodating a respective echo function A(t). The echo functions A(t) are stored in the columns in a sequence corresponding to the fill levels L associated with the respective echo functions A(t). In operation, the echo function A(t) of the currently recorded, received signal R is formed and that echo function A(t) of the table ascertained, which has the greatest agreement with the current echo function A(t). From the column index of this echo function A(t) there results directly the echo position $t_L$ of the fill-level echo $E_L$. Moreover, shown in the table are height lines, which reflect the dependence of the echo positions $t_E$ of the wanted echos E of the individual wanted echo types as a function of the fill level L. Each height line is associated, in such case, with a certain wanted echo type. If, thus, an echo of the current echo function A(t) is at such a height line, it is correspondingly identified as a wanted echo E of the associated, wanted echo type.

Taken into consideration for detecting container floor- and disturbance echoes $E_F$, $E_{DI}$ are the transmission characteristic of the fill substance 1, the propagation velocity of the signals in the fill substance 1, as well as the installed height of the disturbance 9, respectively the installed height H of the transmitting and receiving system 11 over the floor 17.

In the case of a fill substance 1, which is non-transmissive for the transmission signal S, the disturbance echo $E_{DI}$ and the container floor echo $E_F$ have each a characteristic echo position $t_{DI}$, $t_F$, which results from its distance from the transmitting and receiving element 11.

If the fill substance 1 is transmissive for the transmission signal S, then upper- and lower limits can be given for the echo positions $t_{DI}$, $t_F$ of the disturbance echoes DI and the container floor echo F. The upper limits correspond to a signal travel time to the disturbance 9, respectively to the floor 17, and back in the case of full container 3. The lower limits correspond to a signal travel time to the disturbance 9, respectively to the floor 17, and back in the case of empty container 3. Both wanted echo types can only occur in the echo position range limited by the upper- and lower limits.

Correspondingly, identified as disturbance echo respectively as container floor echo $E_F$, can be, for example, same as in the case of the fill level echo recognition, the first echo, respectively the echo with the largest amplitude, that lies within the respective, limited, echo position range.

Multi-echos attributable to a certain reflector are usually identified based on their echo position. In such case, the echo position of an echo must correspond to an integer multiple of the echo position of the wanted echo E attributable to a one-time reflection on the respective reflector, in order to be identified as a multi-echo attributable to such reflector. Moreover, a rate of change, with which a multi-echo changes its echo position, is necessarily equal to an integer multiple of the rate of change, with which the echo position of the wanted echo E attributable to the one-time reflection on the respective reflector changes. Correspondingly, these rates of change can be determined based on the current echo position and the echo positions $t_E$ ascertained in at least one preceding measuring cycle for the respective echo E and taken into consideration for identification of multi-echos.

In the case of all of these echo recognition methods, supplementally, a preferably echo position dependent, predefined, minimum amplitude can be predetermined, which the amplitude of an echo must exceed, in order to be recognized as wanted echo E.

Moreover, the wanted echos E of the individual wanted echo types can be identified by determining, based on the last echo position $t_E$ ascertained in a preceding measuring cycle and a rate of change of the echo position $t_E$ of this wanted echo type, a limited echo position range, in which the wanted echo E of this wanted echo type must be located in the current echo function A(t). The rate of change can be estimated based on a maximum possible fill level change rate in the respective container 3. Alternatively, it can be derived based on the echo positions $t_E$ of the wanted echos E of this wanted echo type ascertained in preceding measuring cycles. Correspondingly, also here, again the first echo, respectively the echo with the largest amplitude, that lies within the respective, limited, corresponding echo position range, can be identified as the sought wanted echo E.

According to the invention, in a next step, echo quality $Q_E$ is determined for each wanted echo E ascertained in the echo function A(t). In such case, the echo quality $Q_E$ of a wanted echo E is higher, the more peak shaped the echo function A(t) is in the region of the respective wanted echo E, and the more isolated from other local maxima the particular wanted echo E is in the echo function A(t).

The echo quality $Q_E$ of the wanted echo E is preferably ascertained based on at least one quality indicator derivable from the echo function A(t).

Such a quality indicator is an area enclosed under the echo function A(t) in a window W defined around the maximum of the wanted echo E.

Figure 3:
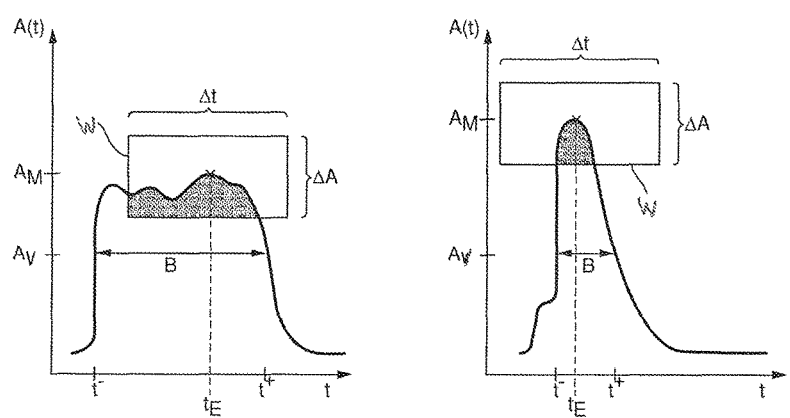
FIG. 3 on the right, a peak shaped, insolated echo, and, on the left, a splintered echo.

FIG. 3 shows, for this, a comparison of two wanted echos, of which the right is peak shaped and isolated, while the left is a greatly more spread out, splintered, wanted echo E. In each case, a window W of predetermined position breadth Δt and amplitude height ΔA is drawn, whose midpoint coincides with the point of the echo function A(t) defined by the maximum amplitude $A_M$ and the associated echo position $t_E$ of the wanted echo E. The area enclosed, in each case, in the window W under the echo function A(t) is indicated in gray. The wanted echo E has, thus, a greater echo quality $Q_E$, the smaller the enclosed area is.

For quantitative determining of the echo quality $Q_E$ of the wanted echo E, a ratio of the enclosed area to a reference area can be calculated. Suited as reference area is e.g. the surface area of the window W or an area enclosed in the window W under an ideally formed, wanted echo.

Associated with signal propagation in the container 3 is dispersion. This leads to the fact that echos, which are attributable to reflections on more remote reflectors, have a greater breadth than those, which are attributable to reflections at lesser distances from the transmitting and receiving system 11. This dispersion related, echo broadening dependent on distance of the reflector from the transmitting and receiving system 11 can be taken into consideration in the case of quality determination by pre-determining the position breadth Δt of the window W as a function of the position $t_E$ of the center of the window.

Alternatively, a constant window size can be predetermined, and the echo quality Q determined based on the area enclosed under the echo function A(t) relative to a reference area predetermined as a function of the position $t_E$ of the center of the window.

This quality indicator is alone suitable for determining echo quality Q.

Alternatively or supplementally, other quality indicators can be determined.

Such a further quality indicator is, for example, a breadth B of the wanted echo E. It is preferably determined in such a manner that, starting from the echo position $t_E$ of the maximum on both sides of the maximum, in each case, that position $t^+$, $t^-$ is determined, at which the amplitude A of the echo function A(t) has fallen to a value $A_V$ predetermined preferably as a function of the maximum amplitude $A_M$ of the wanted echo E. An example is a sinking by an amount in the order of magnitude of 10 dB. The difference $\Delta t = t^+ - t^-$ of these two positions $t^+$, $t^-$ corresponds to the breadth B. In such case, the echo quality $Q_E$ of the wanted echo E decreases with increasing breadth B.

A further example for this is provided by the separations of the echo position $t_E$ of the wanted echo E from the positions of the two directly neighboring local maxima of the echo function A(t).

An additional quality indicator is formed by the amplitude $A_M$ of the maximum of the wanted echo E relative to its breadth B. Also, in such case, dispersion related, echo broadening can be taken into consideration by multiplying the ratio with a factor dependent on the echo position $t_E$ of the wanted echo E.

Moreover, the ratios of the amplitude $A_M$ of the maximum of the wanted echo E to the amplitudes of the two directly neighboring local maxima of the echo function A(t) to the right and left form other quality indicators.

Likewise, the ratios of the amplitude $A_M$ of the maximum of the wanted echo E to the amplitudes of the two directly neighboring local minima of the echo function A(t) to the right and left form other quality indicators.

Echo quality Q is calculated, for example, based on the sum of the above detailed, quality indicators, wherein each of these quality indicators is preferably included into the sum with a weighting factor representing its meaning and/or significance for the particular wanted echo E.

In such case, different quality indicators can be applied for wanted echos E of different wanted echo type for determining their echo quality $Q_E$.

Following the quality determinations for the wanted echos E, fill level L is determined taking into consideration the qualities $Q_E$ of the wanted echos E available for such.

In such case, in each measuring cycle, preferably exclusively those available wanted echos E are applied for fill level determination, whose echo quality $Q_E$ exceeds a predetermined minimum measure.

Preferably, based on the echo qualities $Q_E$ of the wanted echos E, which occurred and could be identified in the respective echo function A(t), those wanted echos E are determined, from whose properties due to their echo quality $Q_E$ reliable information can be derived, so that it is assured that exclusively reliable information is taken into consideration for fill level determination.

Fundamentally, the most varied of methods known from the state of the art can be used for fill level determination. The methods differ, among other things, in the type and number of wanted echo types required for their performance.

The individual methods for fill level determination are furnished in the fill-level measuring device 5, for example, in the form of software executable by the signal processing means 19.

After the identifiable wanted echos E contained in the echo function A(t) and their echo qualities $Q_E$ have been determined, thus, based on the therewith available wanted echos E of sufficient echo quality $Q_E$, those methods can be selected, which are performable based on the available wanted echo types. If a number of methods are possible, preferably that method is selected and applied, in the case of which the available wanted echos E required therefor have the highest echo qualities $Q_E$.

Moreover, preferably a ranking of the individual methods for fill level determination is established and taken into consideration in selecting the method to apply. The ranking is established by sorting the individual methods according to the accuracy of the fill level measurement results achievable therewith.

Thus, the fill level L can be determined usually clearly more exactly from the echo position $t_L$, of a fill-level echo $E_L$ then from the echo position $t_F$ of a container floor echo $E_F$ of comparable echo quality Q. A reason for this is that the signal propagation of the transmitted and received signals S, R on the path from the transmitting and receiving unit 11 to the surface of the fill substance 15 is usually clearly exposed to less disturbing influences and/or degradations than on the path from the transmitting and receiving unit 11 to the container floor 17. A further reason is that the echo position $t_F$ of the container floor echo $E_F$ is dependent on the propagation velocity of the signals in the fill substance 1, a parameter which frequently is not known with high accuracy, and, moreover, e.g. due to processes running in the container 3, can be subject to fluctuations. The same holds naturally also for methods, in the case of which the fill level L is determined based on the echo position $t_{DI}$ of a disturbance echo $E_{DI}$. The latter are in any event only applicable for determining fill levels L lying above the installed height of the associated disturbance 9.

In striving to use as high ranking methods as possible for fill level determination, preferably a high ranking basic method is used, to which supplemental methods are added as needed. The supplemental methods serve to furnish to the basic method required information, which is not directly available e.g. due to wanted echos E not being identifiable in the echo function A(t), or due to poor echo quality Q of wanted echos E important for fill level determination.

Such a high ranking, basic method is the above mentioned fill level determination based on the echo position $t_L$ of the fill-level echo $E_L$.

If, in the current echo function A(t), a fill-level echo $E_L$ of sufficient high quality $Q_{EL}$ can be determined, fill level L is determined based on its echo position $t_L$. This is, for example, the case in the echo function A(t) illustrated in FIG. 2a. The fill level L lies here clearly above the stirrer 7. The associated fill-level echo $E_L$ is identifiable in the illustrated echo function A(t), without there being any doubt as to the correctness of the identification, based on its echo position $t_L$ as the first echo and, moreover, also the echo having the highest amplitude A and additionally a high echo quality $Q_{EL}$.

The situation is, in contrast, otherwise in the echo function A(t) illustrated in FIG. 2b. There the fill level L to be measured is located in the region of the stirrer 9. In the associated position range of the echo function A(t) there occur in the illustrated example three closely adjoining local maxima of comparable amplitude. Here it is quite possible that no fill-level echo L can be determined by means of the echo recognition method. If, however, a fill-level echo L has been identified, it surely has a low echo quality Q. In both cases, thus, no usable fill-level echo $E_L$ is available.

In order nevertheless to be able to apply the above mentioned, high ranking, basic method, the lacking information is ascertained, to the extent possible, by a suitable supplemental method.

Such a supplemental method involves ascertaining the fill-level echo $E_L$, respectively its echo position $t_L$, based on the container floor echo $E_F$ likewise present in the echo function A(t). Since the fill level L here is located above the installed height of the disturbance 9, there is alternatively also the option of ascertainment based on the disturbance echoes $E_{DI}$. In such case, based on the echo positions $t_{DI}$, $t_{DI}$ of the container floor echo $E_F$, respectively of the disturbance echo $E_{DI}$, and the propagation velocity of the signals in the fill substance 1, an echo position range $\Delta t_L$ is calculated, in which the fill-level echo $E_L$ must be located. In such case, the fill level determination based on the container floor echo $E_F$, respectively on the disturbance echo $E_{DI}$, represents a lower ranking, basic method, which could, by accepting the therewith connected lesser accuracy of measurement, be used alone for fill level determination. Better measurement accuracies can be achieved, when this lower ranking, basic method is applied as a supplemental method, with which in a first method step an echo position range $\Delta t_L$ is determined, in which the fill-level echo $E_L$ is to be expected in the current echo function A(t). In such case, the breadth this echo position range $\Delta t_L$ corresponds to the measurement inaccuracy, or tolerance, associated with the lower ranking, basic method. In a second method step, the fill-level echo $E_L$ is ascertained in this echo position range $\Delta t_L$ of the echo function A(t), which is clearly more focused compared with the starting situation. In such case, applied in this echo position range $\Delta t_L$ can be the same echo recognition criteria, which were earlier applied to the entire echo function A(t). I.e., for example, the first local maximum, respectively the local maximum having the greatest amplitude within the echo position range $\Delta t_L$, is identified as fill-level echo $E_L$. Then, based on the echo position t'L of the fill-level echo $E_L$ determined based on the supplemental method, the fill level L is determined according to the basic method.

According to the invention, also in the case of selection and application of the supplemental method, the echo quality $Q_{EL}$ of the therefor required, wanted echos E is taken into consideration. In the example illustrated in FIG. 2b, the disturbance echo $E_{DI}$ has a high echo quality $Q_{EDI}$, while, in contrast, the container floor echo $E_F$ is strongly splintered and, thus, of very low echo quality $Q_{EF}$. Consequently, no information inflowing into the fill level determination should be derived from the container floor echo $E_F$, because of its poor quality. In contrast, the disturbance echo $E_{DI}$ is, due to its high quality $Q_{EDI}$, quite suitable as a source of information for the fill level determination. Correspondingly, in the present example, due to the qualities $Q_{EDI}$, $Q_{EF}$ of the wanted echos E, the supplemental method based on the disturbance echo $E_{DI}$ is selected and executed. If both the disturbance echo $E_{DI}$ as well as also the container floor echo $E_F$ were of poor quality Q, then neither of the two supplemental methods would be used.

Alternatively, an application of the basic method is not pursued, when the wanted echo E required therefor cannot be identified or has a poor quality $Q_E$. In that case, to the extent possible, another method is applied for fill level determination, when the wanted echos E required therefor can be identified and have a high echo quality $Q_E$. Thus, in the example illustrated in FIG. 2b, the fill-level echo $E_L$ is not used and the fill level L is determined based on the disturbance echo $E_{DI}$ having the high quality $Q_{DI}$. Alternatively, instead of the basic method, an echo tracking method described in detail below can be applied, with which a fill level echo position $t_L'$ expected for the fill-level echo $E_L$ is determined, based on which the fill level L is then directly determined.

Echo tracking methods can be applied in the context of fill level measurement for individual or all wanted echo types. In such case, based on echo functions A(t) recorded in preceding measuring cycles, a time development of the echo positions $t_E$ of the wanted echos E contained in the echo functions A(t) for the respectively wanted echo type to be tracked is ascertained. For this, in each measuring cycle, the echo positions $t_E$ of the corresponding wanted echos E identified in the echo function A(t) and the point in time of registering the associated echo function A(t) are recorded. From the time development, there results directly the last determined echo position $t_E$ of the respective wanted echo E and its rate of change. Then, based on the time development of the echo positions $t_E$ of the wanted echos E of the respective wanted echo type, an expected echo position $T_E$ of the wanted echo E of this wanted echo type can be extrapolated in the current echo function A(t).

Preferably, also in the case of echo tracking, the echo quality Q of the wanted echos E referenced in its execution and identified in the respective echo functions A(t) is taken into consideration. This is done, for example, by determining in the sequentially recorded echo functions A(t) the echo positions $t_E$ of those wanted echos E of the wanted echo type to be tracked, which have a minimum measure of echo quality Q. Correspondingly, exclusively the echo positions $t_E$ of those wanted echos E of the respective wanted echo type having a minimum measure of echo quality Q are recorded, together with the point in time of the registering of the associated echo function A(t), and therefrom the time development of the wanted echo E of the respective wanted echo type determined, from which then, for the respective wanted echo type, the expected echo position $T_E$ of the corresponding wanted echo E in the current echo function A(t) can be extrapolated and made available.

Moreover, preferably based on the echo qualities $Q_E$ of the wanted echos E used for echo tracking of a certain wanted echo type, the time intervals between their registering and a maximum fill level change rate occurring in the container. 3, an accuracy of the respective echo position $T_E$ extrapolated by means of echo tracking is estimated. This offers the advantage that accuracy can be taken into consideration in the case of later application of the echo position $T_E$ extrapolated by means of echo tracking. In this way, it can, among other things, be assured that inexact extrapolated echo positions $T_E$ of the application are excluded.

This echo tracking can be applied in the fill-level measuring method of the invention in the context of an echo recognition method for identification of wanted echos E by limiting the position range, in which the echo recognition method for identification of the wanted echo E of the respective wanted echo type is executed, to a limited position range of $T_E+/-\Delta T$ around the expected echo position $T_E$ of the respective wanted echo E.

Moreover, expected echo positions $T_E$ ascertained by means of echo tracking can be used in the fill level determination method as replacements for corresponding echo positions $t_E$ of the wanted echo E of the respective wanted echo type. The is sensible, for example, when the corresponding wanted echo E cannot be identified or is of poor echo quality Q in the current echo function A(t). Thus, the fill level L can, for example, be determined according to the above basic method by using the expected echo position $T_E$ of the fill-level echo $E_L$ instead of a fill level echo position $t_L$ derived from the current echo function A(t).

Moreover, echo tracking represents a further supplemental method, which can be applied in connection with the above described basic method. In such case, based on the expected echo position $T_E$ of the fill-level echo $E_L$, the corresponding echo position range $T_{EL}+/-\Delta T_L$ can be predetermined and subsequently the fill-level echo $E_L$ contained in the current echo function A(t) ascertained in this limited echo position range $T_{EL}+/-\Delta T_L$.

The echo qualities $Q_E$ of the wanted echos E are preferably taken into consideration not only in the case of fill level determination, but, instead, also in the context of, in given cases, applied reviews of end- or intermediate results of the fill level determination. Thus, a fill level L determined based on the echo position $t_L$ of the fill-level echo $E_L$ should not be checked for its correctness based on a fill level L derived from the echo position E of a qualitatively worse wanted echo E. By taking into consideration echo qualities $Q_E$, it is assured e.g. that a fill level L determined based on the echo position $t_L$ of a qualitatively better fill-level echo $E_L$ is not incorrectly discarded, because it lies outside of the echo position range expected based on the echo position $t_E$ of a qualitatively worse, other wanted echo E, e.g. a splintered container floor echo $E_F$.

The same holds analogously for plausibility checks of end- or intermediate results of fill level determination. An example for this involves plausibility checks based on physical relationships. Thus, for example, the fill level echo position $t_L$ must increase in the case of sinking fill level L and the container floor echo position $t_F$ must decrease. For performing a plausibility check based on this, for example, the rates of change of the fill level echo position $t_L$ and the container floor echo position E are ascertained based on the corresponding echo positions E of these wanted echos E in the last recorded echo functions A(t). If the two rates of change have the same sign, a disagreement has been detected.

If one would use for this all identified wanted echos E, there is the danger of erroneous conclusions. Thus, for example, the case could arise that, in the case of sinking fill level L, an occurring, interference related broadening of the container floor echo $E_F$ leads incorrectly to the conclusion that a positive rate of change of the container floor echo position $t_E$ has been detected.

In order to preclude this, consequently, only high-quality wanted echos E should be taken into consideration for deriving the information required for the particular plausibility checks. In this way, it is prevented that additional conclusions are drawn from possibly corrupted information.

The invention is basically applicable analogously also in connection with other fill-level measuring devices working according to the travel time principle. Example of this are fill level measuring devices working with microwaves according to the travel time principle, in the case of which a transmission signal generator produces short signal pulses, which are sent via a transmitting and receiving system to a waveguide protruding into the container. In such case, the signal pulses are guided along the waveguide into the container. In general, where along the waveguide an impedance jump occurs, especially at the surface of the fill substance, in the vicinity of disturbances installed in the container, and at the end of the waveguide, a signal fraction of the transmission signal pulse is reflected back to the transmitting and receiving system. Also in this case, based on the received signals formed by superpositioning of the signal components reflected back to the transmitting and receiving system, echo functions are derived, which give the amplitudes of the received signals as a function of a position corresponding to the associated travel time. Also, in the case of these fill-level measuring devices, fill level is ascertained based on wanted echos of predetermined wanted echo types identifiable in the respective echo function.

Fundamentally, the invention is also applicable in connection with fill-level measuring devices working with ultrasound according to the travel time principle. These devices use as transmitting and receiving unit, as a rule, an electromechanical transducer, especially a piezoelectric transducer, with which periodically short ultrasonic pulses of predetermined frequency are produced and emitted, and the thereon striking ultrasonic signal converted into electrical, received signals. Also, these fill level measuring devices derive based on the received signals an echo function giving amplitude of the received signals as a function of position representing the associated travel time. Also in this case, identifiable wanted echos contained in the echo function are determined and the fill level computed based on these wanted echos. In contrast to microwave signals, ultrasonic signals are usually almost completely reflected on the surface of the fill substance of the fill substance. Correspondingly, contained in the echo functions are, as a rule, only fill-level echo and multi-echos arising from multiple reflections on the surface of the fill substance. The method of the invention is correspondingly applicable in the above described manner also for these ultrasonic devices. Container floor echos occur, in contrast, only when the container is empty.

The invention claimed is:

1. A method for measuring fill level of a fill substance located in a container with a fill-level measuring device working according to the travel time principle, wherein the fill-level measuring device is mounted on the container, comprising the steps of:

sending transmission signals by means of a transmitting and receiving unit into the container and their fractions reflected on reflectors in the container back to the transmitting and receiving unit according to a travel time dependent on the path length traveled in this way are received as received signals;

deriving echo functions based on the received signals, which give amplitudes of the received signals as a function of position corresponding to associated travel time;

ascertaining wanted echos of predetermined wanted echo types respectively contained in the echo functions and identifiable based on predetermined echo recognition methods, wherein each wanted echo is a local maximum of the echo function and is attributable to a reflection on a reflector associated with its wanted echo type, especially a surface on the fill substance, a container floor or a disturbance located in the container;

a time development of the echo position of wanted echos of at least one wanted echo type is recorded, in that in sequentially recorded echo functions the echo positions of those wanted echos of such wanted echo type are determined, which meet a minimum measure of echo quality, and the echo positions of these wanted echos are recorded together with the point in time of the recording of the associated echo function;

an echo position of the wanted echo of this wanted echo type expected in the current echo function is extrapolated based on the time development of the echo position of the wanted echos of this wanted echo type;

this extrapolated echo position is provided, as a replacement for the echo position of the respective wanted echo in the current echo function, for identification of the wanted echo of the respective wanted echo type in the current echo function and/or for fill level determination;

determining echo quality of each wanted echo, wherein the echo quality is higher, the more peak shaped the echo function is in the region of the respective wanted echo and the more isolated from other local maxima the respective wanted echo is in the echo function; and determining the fill level taking into consideration echo qualities of the wanted echos, wherein:

the echo qualities of the wanted echos are determined based on:

an area enclosed under the echo function in a window of predetermined position breadth and amplitude height surrounding the maximum of the respective wanted echo;

a breadth of the wanted echo, which equals a difference between two positions, in the case of which the amplitude of the echo function, based on the echo position of the maximum of the wanted echo, has fallen on both sides to a predetermined value, predetermined as a function of the maximum amplitude of the wanted echo;

distances of the echo position of the respective wanted echo to positions of directly neighboring local maxima of the echo function;

ratios of the amplitude of the maximum of the respective wanted echo to the amplitudes of directly neighboring local maxima of the echo function; and/or ratios of the amplitude of the maximum of the respective wanted echo to the amplitude of directly neighboring local minima of the echo function.

2. The method as claimed In claim 1, wherein:
the fill level is determined exclusively based on wanted echos, whose echo quality exceeds a predetermined minimum measure.

3. The method as claimed in claim 1, wherein:
based on the echo qualities of the wanted echos, those wanted echo are determined, from which due to their echo quality (E) reliable information can be derived; and only reliable information is taken into consideration for determining fill level.

4. The method as claimed in claim 1, wherein:
when, based on the wanted echos identified in one of the echo functions, different methods for fill level determination are performable, the echo qualities of these wanted echos are taken into consideration to select and apply that method, in the case of which the therefor required wanted echos have the highest echo qualities.

5. The method as claimed in claim 1, wherein:
for wanted echos of different wanted echo type different quality criteria are applied for determining their echo quality.

6. The method as claimed in claim 1, wherein:
a basic method is applied for the fill level determination, which determines the fill level based on the position of the wanted echo with the highest echo quality.

7. The method as claimed in claim 6, wherein:
for the case, that no wanted echo with a sufficient echo quality is determined by the basic method, a supplemental method for fill level determination is executed, including:

a first method step, in which an echo position range is determined, in which the fill level echo is to be expected in the current echo function; and a second method step, in which an echo recognition method is executed for identifying the fill level echo in the echo position range of the current echo function.

8. The method as claimed in claim 7, wherein:
the echo position range in the first method step is derived;
based on the echo position of disturbance echos;
based on the echo position of the container floor echo; or
based on a time development of the echo position of the fill-level echo derived from the echo positions of the fill-level echos of earlier recorded echo functions.

9. The method as claimed in claim 1, wherein:
the echo qualities of the wanted echo are taken into consideration in a review and/or a plausibility check of an end or intermediate result of the fill level determination.

* * * * *